(12) United States Patent
Nishimura et al.

(10) Patent No.: US 6,327,789 B1
(45) Date of Patent: Dec. 11, 2001

(54) TOUCH SIGNAL PROBE

(75) Inventors: Kunitoshi Nishimura; Kazuhiko Hidaka; Nobuhisa Nishioki, all of Tsukuba (JP)

(73) Assignee: Mitutoyo Corp., Kanagawa-Ken (JP)

( * ) Notice: Subject to any disclaimer, the term of this patent is extended or adjusted under 35 U.S.C. 154(b) by 0 days.

(21) Appl. No.: 09/366,774

(22) Filed: Aug. 4, 1999

(30) Foreign Application Priority Data

Aug. 4, 1999 (JP) .................................................. 10-220474

(51) Int. Cl.[7] ...................................................... G01B 5/00
(52) U.S. Cl. ................................. 33/561; 33/559; 33/558
(58) Field of Search ............................. 33/559, 503, 504, 33/560, 561, 556, 557, 558

(56) References Cited

U.S. PATENT DOCUMENTS

| 3,869,799 | * | 3/1975 | Neuer et al. ............................. 33/560 |
| 3,888,012 | * | 6/1975 | Droz ........................................ 33/557 |
| 4,123,706 | * | 10/1978 | Roch ...................................... 324/754 |
| 4,338,722 | * | 7/1982 | Delmas .................................... 33/561 |
| 4,397,188 | * | 8/1983 | Banshevichus et al. ................ 73/651 |
| 4,934,065 | * | 6/1990 | Hajdukiewicz et al. ............... 33/832 |
| 4,956,923 | * | 9/1990 | Pettingell et al. ..................... 33/558 |
| 5,024,003 | * | 6/1991 | Breyer ..................................... 33/561 |
| 5,107,114 | * | 4/1992 | Nishioka et al. ..................... 250/306 |
| 5,111,592 | * | 5/1992 | Aehnelt et al. ........................ 33/558 |
| 5,247,751 | * | 9/1993 | Ohya et al. ............................. 33/561 |
| 5,524,354 |   | 6/1996 | Bartzke et al. ........................ 33/561 |
| 5,625,957 | * | 5/1997 | Breyer .................................... 33/503 |
| 5,659,969 | * | 8/1997 | Butler et al. ........................... 33/561 |
| 5,773,913 | * | 6/1998 | Casselden ............................. 310/338 |
| 5,782,004 | * | 7/1998 | Schepperle ............................ 33/503 |
| 5,884,410 | * | 3/1999 | Prinz ...................................... 33/559 |
| 6,094,971 | * | 8/2000 | Edwards et al. ....................... 73/105 |

FOREIGN PATENT DOCUMENTS 6-221806   8/1994  (JP) .

OTHER PUBLICATIONS (1) English Language Abstract of JP 6–221806.

\* cited by examiner

Primary Examiner—Diego Gutierrez
Assistant Examiner—R. Alexander Smith
(74) Attorney, Agent, or Firm—Lowe Hauptman Gilman & Berner, LLP (57) ABSTRACT

In a touch signal probe (10) having a stylus holder (11), a vibrator (12) supported by the stylus holder (11) and has a contact portion (12A) to contact to a workpiece at a distal end thereof, a vibrating means (13A) for vibrating the vibrator (12) in an axial direction resonantly, and a detecting means (13B) for detecting the contact by a change in the vibration of the vibrator (12) caused by the contact to the workpiece is provided. The vibrator (12) is supported by the stylus holder (11) at two support points (A) and (B) positioned with a node of vibration of the vibrator (12) therebetween. Since the vibrating means (13A) and the detecting means (13B) are disposed spanning over the two support points, the node of vibration can be formed between the support points A and B and the size of the touch signal probe (10) can be easily reduced.

19 Claims, 7 Drawing Sheets

TOUCH SIGNAL PROBE

BACKGROUND OF THE INVENTION

1. Field of the Invention

The present invention relates to a touch signal probe for measuring a configuration of a workpiece by a coordinate measuring machine and the like.

2. Description of Related Art

One-dimensional measuring machine, a height gauge for instance, a coordinate measuring machine and a profile measuring machine for measuring configuration of solid body are known as a measuring machine for measuring a configuration and a dimension of a workpiece. Various probes are attached to the measuring machine to detect relative position of a measuring machine body and the workpiece.

The probes are classified into non-contact type probes and contact-type probes, or into continuously measuring probe and touch trigger probe etc.

An ultrasonic touch signal probe disclosed in Japanese Patent Publication Laid-open No. Hei 6-221806 is known as an example of the above-mentioned contact type touch trigger probe for the coordinate measuring machine.

Figure 11:
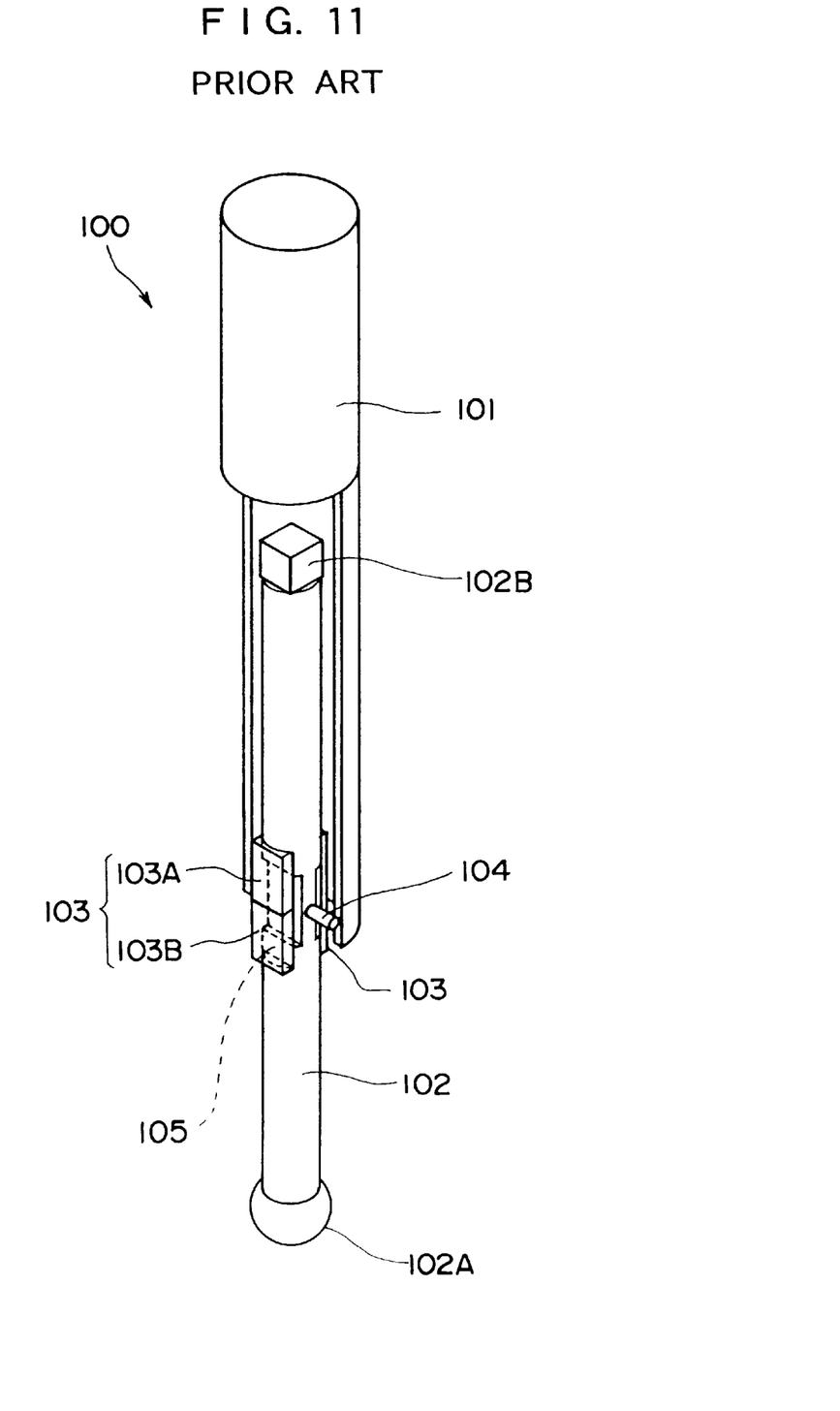
FIG. 11 is a summarized perspective view showing a conventional touch signal prove.

As shown in FIG. 11, a touch signal probe 100 includes a stylus holder 101, a vibrator 102 and piezoelectric element 103 etc. The stylus holder 101 is attached to a movable shaft of a coordinate measuring machine etc (not shown). A contact to the workpiece is detected while the movable axis is moved and the coordinate when the probe touches the workpiece is read, thereby measuring the configuration etc. of the workpiece.

The stylus holder 101 is configured in a hollow cylindrical shape and has the vibrator 102 at a lower inner end (a direction in the figure, equally applied hereinafter) thereof supported by a pair of engage pin 104 disposed on a support point arranged at a substantially central portion in the axial direction of the vibrator 102. A contact ball 102A to be abutted to the workpiece during measurement is mounted on a lower end of the vibrator 102 and a counter balance 102B having the same weight as the contact ball 102A is attached on an upper end of the vibrator 102, so that the support point to the stylus holder 101 is consistent with a centroid of the vibrator 102.

A pair of groove portion 105 formed by cut-out is provided at an outer circumference of the vibrator 102 and the piezoelectric elements 103 are attached spanning over the respective groove portions 105. The pair of groove portion 105 and the pair of the piezoelectric element 103 respectively have the same configuration. Both ends of the respective piezoelectric elements 103 are fixed at two points of the outer circumference of the vibrator 102 across the groove portion 105 by an adhesive etc.

The piezoelectric elements 103 are disposed substantially symmetrically at a center of the support point of the vibrator 102 along the axial direction of the vibrator 102 and are divided into a vibrating means 103A for vibrating the vibrator 102 resonantly and a detecting means 103B for detecting a change in the vibration of the vibrator 102.

In the touch signal probe 100, a node of vibration of the vibrator 102 coincide with the support point when the vibrator 102 is vibrated along the axial direction thereof by the vibrating means 103A.

According to the touch signal probe 100, since the centroid of the vibrator 102 is supported by the stylus holder 101 at a portion of the node of vibration, stability against disturbance vibration is improved to enhance measurement accuracy of the touch signal probe.

However, following problems occur in reducing an entire size of the probe in thus-structured conventional touch signal probe 100.

When the size of the entire touch signal probe 100 is reduced, the size of the support point of the vibrator 102 is reduced in proportion to the entire dimension. In other words, in order to prevent the support point continuous with a non-vibrated stationary portion from restraining the vibration of the vibrator 102, the support point is required to be positioned within a predetermined area adjacent to the node of vibration of the vibrator 102 and the size of the area is lessened when the size of the touch signal probe 100 is reduced, which result in difficulty in supporting the vibrator 102 on account of minute arrangement thereof.

Further, since the vibrating means 103A and the detecting means 103B mounted with the node of vibration therebetween are difficult to be disposed, highly accurate processing and assembly of the components with high accuracy can be difficult.

On the other hand, a vibrator shown in U.S. Pat. No. 5,524,354 is known as a vibrator for a touch trigger probe aiming at reduction in size.

Figure 12:
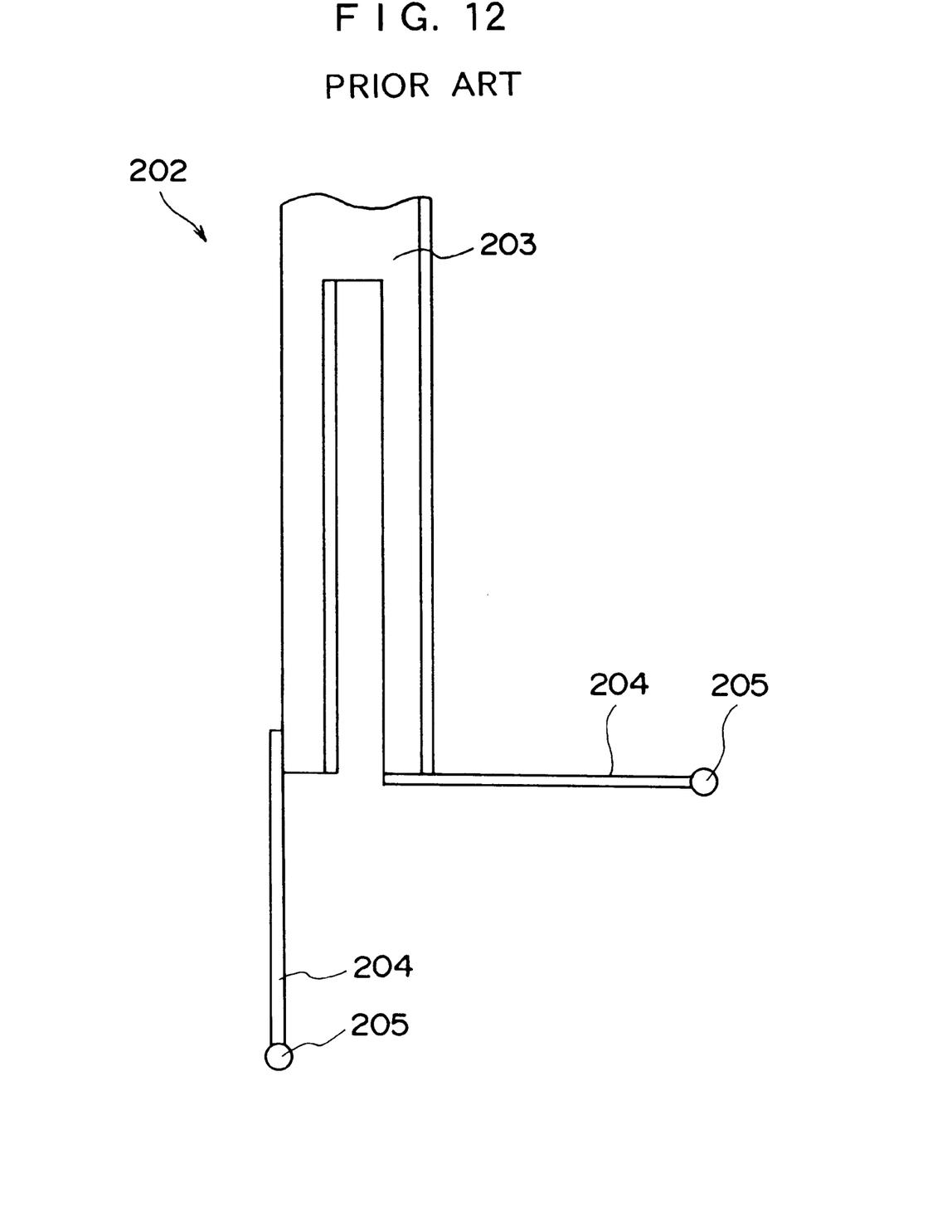
FIG. 12 is a summarized perspective view showing another conventional touch signal probe.

As shown in FIG. 12, a vibrator 202 has a tuning-folk shaped vibrating portion 203, a stick stylus 204 disposed at a pointed end of the tuning-folk shaped vibrating portion 203, and a tip ball 205 disposed at a pointed end of the stylus 204. The respective styluses 204 are arranged to cause flexural vibration in a direction orthogonal with an axial direction thereof in synchronization with the vibration of the tuning-folk shaped vibrating portion 203. Base portion of the tuning-folk shaped vibrating portion 203 does not vibrate and support thereof is easy even when the size of the vibrator 202 is small, and a vibration property at a distal end can be enhanced to enable high sensitivity. Accordingly, the reduction of the size of the touch trigger probe can be easily attained while maintaining high sensitivity thereof.

In the touch trigger probe utilizing the vibrator 202, however, since the stylus 204 causes flexural vibration in synchronization with the vibration of the tuning-folk shaped vibrating portion 203, the sensitivity can be widely varied according to which part of the tip ball 205 contacts the workpiece (having direction dependence). Further, since the vibration range of the distal portion of the stylus 204 is generally set large, the accuracy cannot be obtained as compared to ordinary touch trigger probe.

SUMMARY OF THE INVENTION

An object of the present invention is to provide a touch signal probe of which size can be easily reduced while maintaining high accuracy.

The present invention is a touch signal probe having a stylus holder, a vibrator supported by the stylus holder and having a contact portion to contact to a workpiece at a distal end thereof, a vibrating means for vibrating the vibrator in resonant condition in an axial direction of the vibrator, and a detecting means for detecting a contact of the vibrator with the workpiece by a change in the vibration of the vibrator caused when the vibrator contacts the workpiece, which is characterized in that the vibrator is supported by the stylus holder at two support points opposing with a node of vibration therebetween.

According to the present invention, since the vibrator is supported by the stylus holder at the two support points opposing with the node of vibration therebetween, the node of vibration can be formed at a portion between the two support points of the stylus by disposing the vibrating means and the detecting means spanning over the two support points. Therefore, since the support points are not limited to a small area, thereby simplifying a support structure and facilitating to attach the vibrating means and the detecting means, so that the size of the touch signal probe can be easily materialized.

Further, since the vibrator is supported at two points, the horizontal vibration in a direction orthogonal with the axial direction of the vibrator can be minimized to a negligible degree, thereby improving the detecting accuracy of the touch signal probe.

In the present invention, the node of vibration of the vibrator is preferably positioned at a center of the two support points and is preferably consistent with a centroid of the vibrator.

Figure 1:
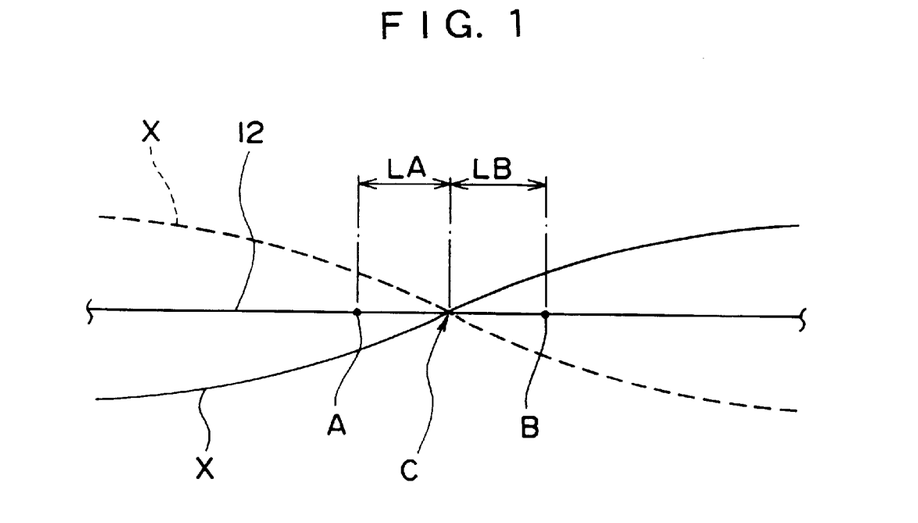
FIG. 1 is a schematic view for explaining a function of the present invention.

More specifically, as shown in schematic view of FIG. 1, the stick-shaped vibrator 12 is preferably supported by the two support points A and B and a point C of the node of vibration in an axial direction of the vibrator 12 is preferably the center of the two support points A and B (LA=LB). Incidentally, vibration width X of the vibration in the axial direction is shown orthogonally with the axis.

According to the above arrangement, since the node of vibration of the vibrator is positioned at the center of the two support points and is consistent with the centroid of the vibrator, an influence by a disturbance vibration etc. of the touch signal probe can be decreased and the detection accuracy of the workpiece can be improved.

Incidentally, the two support points A and B is preferably of the same configuration, and static and dynamic mechanical strength of the stylus holdter viewed from the respective support points A and B are preferably arranged identical, in other words, the mechanical impedance at the both support points A and B is preferably set equal.

In the present invention, the vibrating means and the detecting means are preferably disposed spanning over the two support points. Specifically, the vibrating means is preferably disposed to a side of the stick-shaped vibrator to span over the two support points and the detecting means is preferably disposed on a side opposite to the side having the vibrating means to span over the two support points.

Accordingly, the vibrating means and the detecting means can be formed in a size corresponding to a distance between the two support points, thereby simplifying the processing and assembly without impairing detection accuracy of the touch signal probe of which size is reduced.

In the present invention, the stylus holder is preferably made of piezoelectric material and the vibrating means and the detecting means are preferably integrated with the stylus holder. Specifically, the stylus holder is preferably formed by a piezoelectric material such as crystal and the vibrating means etc. is formed on a side of the vibrator attaching portion to be the two support points.

Accordingly, the arrangement of the touch signal probe can be simplified, thereby further facilitating size reduction of the touch signal probe.

DETAILED DESCRIPTION OF PREFERRED EMBODIMENT(S)

An embodiment of the present invention will be described below with reference to attached drawings.

Figure 2:
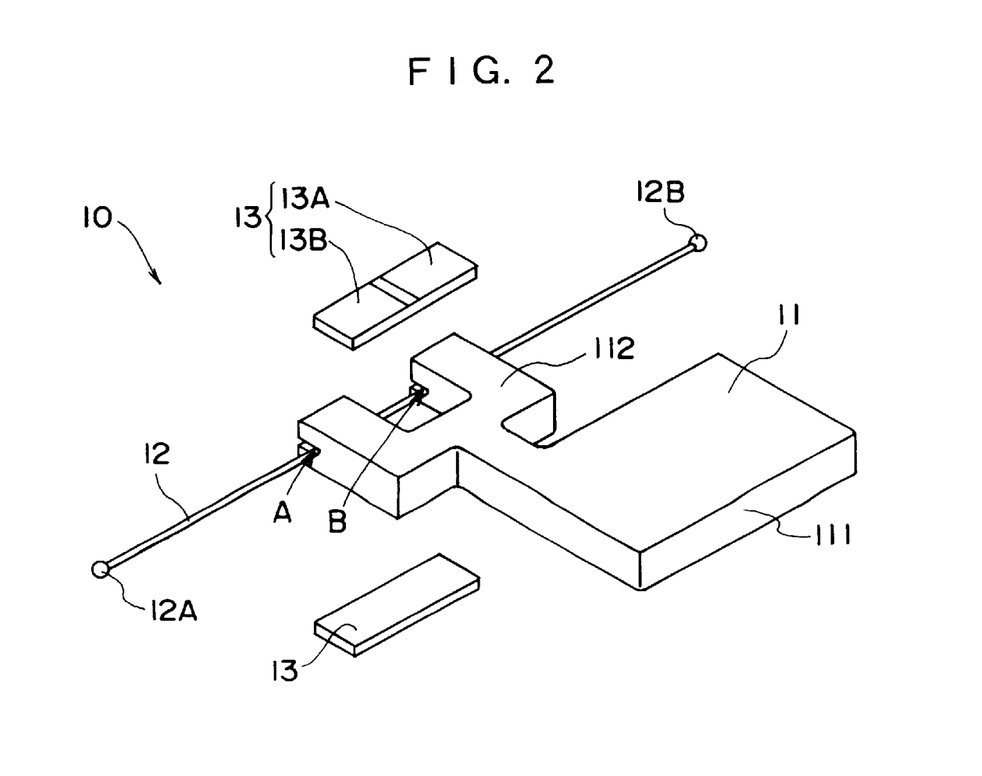
FIG. 2 is an exploded perspective view showing an arrangement of a touch signal prove according to first embodiment of the present invention.

FIG. 2 shows a touch signal probe 10 according to first embodiment of the present invention. The touch signal probe 10 is for measuring a small holes having aspect ratio of more than or the same as 30, which includes a stylus holder 11, a vibrator 12 and two piezoelectric elements 13.

The stylus holder 11 has a stationary portion 111 to be attached to movable shaft of a coordinate measuring machine etc. and a vibrator attachment portion 112 for mounting and fixing the vibrator 12. The vibrator attachment portion 112 is branched in two ways and the vibrator 12 is supported at distal two points of the branch, the two points being support points A and B in FIG. 1.

The branched portion of the vibrator attachment portion 112 is arranged to be the same configuration. A large constriction is formed between the vibrator attachment portion 112 and the stationary portion 111 in order to equalize mechanical impedance at the support points A and B of the stylus holder 11. More specifically, since the vibrator attachment portion 112 is symmetrical in an axial direction of the vibrator 12 and the stationary portion 111 is unsymmetrical in the axial direction of the vibrator 12, the constriction is formed to eliminate the influence of the asymmetry to equalize mechanical strength of the branched portion of the vibrator attachment portion 112.

The vibrator 12 is made of a stick member having the same diameter. A ball-shaped contact portion 12A to contact to the workpiece is formed at a distal end of the vibrator 12 and a counter balance 12B having the same weight as the contact portion 12A is formed at a base end of the vibrator 12. Incidentally, the contact portion 12A may not be ball-shaped but may be disk-shaped, which is determined in accordance with a configuration of the workpiece. Further, though the counter balance 12B is also arranged in a ball-shape in the same manner as the contact portion 12A, a cubic configuration having the same weight as the contact portion 12A may also be used.

The vibrator 12 has the contact portion 12A and the counter balance 12B having the same weight at the distal end and the base end thereof, and has a centroid position at a central position in the axial direction thereof.

When the vibrator 12 is attached to the vibrator attachment portion 112, the vibrator 12 is fixed by an adhesive or the like so that the centroid position of the vibrator 12 is consistent with the center of the support points A and B.

Two piezoelectric elements 13 is for vibrating the vibrator 12 resonantly and for detecting a change in the vibration of the vibrator 12 caused when the vibrator 12 touches the workpiece. A lower side of the piezoelectric element 13 disposed at upside in FIG. 2 and an upper side of the piezoelectric element 13 disposed at downside are arranged to be common electrodes. The upper side of the piezoelectric element 13 disposed at the upside in FIG. 2 is divided into the vibrating means 13A and the detecting means 13B at a position corresponding to the center of the support points A and B of the vibrator attachment portion 112. Further, the lower side of the piezoelectric element 13 disposed at the downside in FIG. 2 is likewise divided into two areas.

Figure 3:
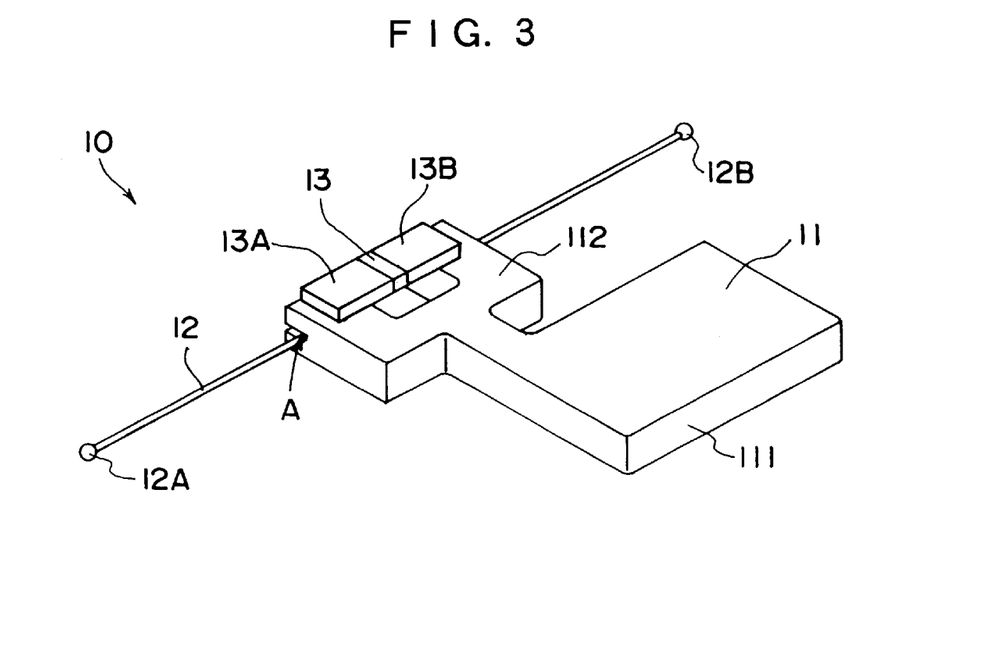
FIG. 3 is a summarized perspective view showing a condition where a, vibrating means and a detecting means is attached to a stylus holder of the aforesaid embodiment.

The piezoelectric elements 13 are disposed spanning over the aforesaid branched portion of the vibrator attachment portion 112 of the stylus holder 11, which is fixed by adhesion, solder etc.

In other words, the vibrating means 13A and the detecting means 13B are symmetrically disposed at the central portion of the support points A and B along the axial direction.

Further, since the other piezoelectric element 13 having the same arrangement as the piezoelectric element 13 constituting the vibrating means 13A and the detecting means 13B is disposed oppositely thereto, the touch signal probe 10 has substantially symmetrically arrangement in a direction orthogonal with the axial direction of the vibrator 12.

As described above, the touch signal probe 10 having the above arrangement is used as a contact-type touch trigger probe for coordinate measuring machine etc. More specifically, when electric voltage is applied to the piezoelectric element 13 constituting the vibrating means 13A and the common electrode, the vibrator 12 vibrates resonantly along the axial direction. Subsequently, when the workpiece touches the contact portion 12A, the vibration of the vibrator 12 causes change, which is detected by the detecting means 13B thereby reading the coordinate when the vibration is changed. Incidentally, the node of vibration of the vibrator 12 is formed consistently with the central position of the support points A and B, thereby improving the stability against disturbance vibration.

According to the above-described first embodiment, following effects can be obtained.

Since the vibrator 12 is supported at the two support points A and 13 with the node of vibration therebetween, the node of vibration can be formed between the two support points A and B by disposing the piezoelectric element 13 constituting the vibrating means 13A and the detecting means 13B spanning over the two support points A and B. Accordingly, the vibrating means 13A and the detecting means 13B can be easily attached to the stylus holder 11, thereby facilitating size reduction of the touch signal probe 10.

Since the vibrator 12 is supported at two points, horizontal vibration in a direction orthogonal with the axial direction of the vibrator 12 can be minimized to an negligible degree, so that the detecting accuracy of the touch signal probe 10 is not lowered.

Further, since the node of vibration of the vibrator 12 is positioned at the center of the two support points A and B and is consistent with the centroid of the vibrator 12, the influence by the disturbance vibration of the touch signal probe 10 can be decreased, thereby improving accuracy for detecting the workpiece.

Next, second embodiment of the present invention will be described below. Incidentally, in the following description, identical or similar reference numeral is applied to a portion identical with or similar to the above-described portions, thereby omitting or simplifying the explanation.

The piezoelectric element 13 disposed at the upside in FIG. 2 is divided into the vibrating means 13A and the detecting means 13B in the touch signal probe 10 according to first embodiment.

Figure 4:
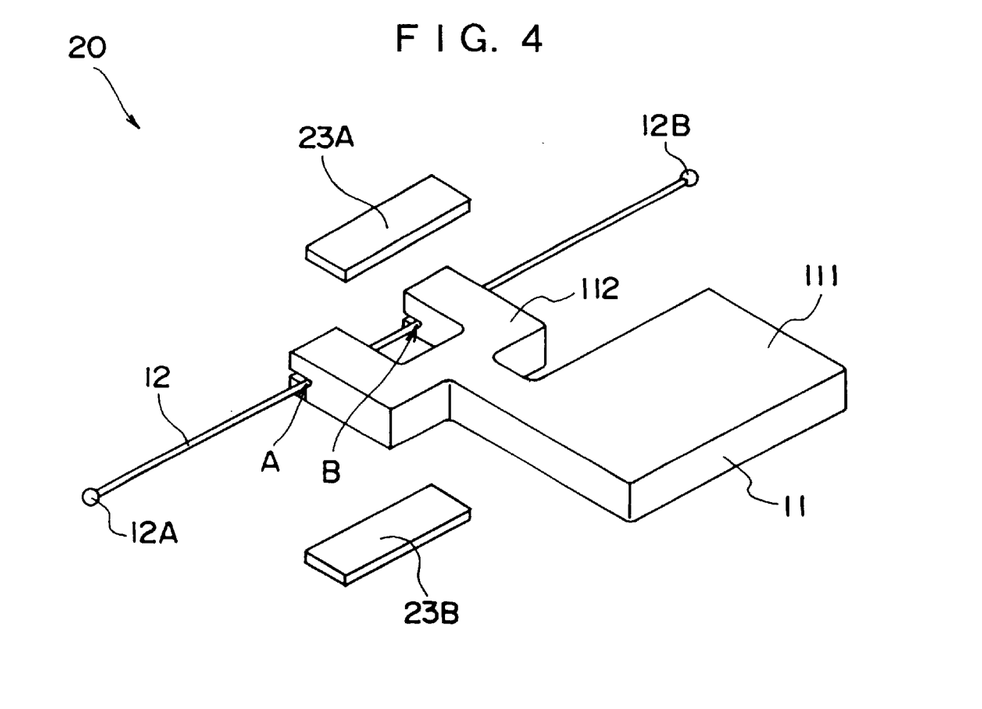
FIG. 4 is an exploded perspective view showing a touch signal probe according to second embodiment of the present invention.

In contrast thereto, as shown in FIG. 4, a touch signal probe 20 according to the second embodiment has a piezoelectric element disposed upside constituting vibrating means 23A and another piezoelectric element disposed downside constituting detecting means 23B, the vibrating means 23A and the detecting means 23B spanning over the support points A and B. Incidentally, the other arrangement such as the stylus holder 11 and the vibrator 12, and the function of the touch signal probe 20 is the same as the first embodiment, so that the explanation thereof will be omitted here.

According to the touch signal probe 20 of the second embodiment, following effect can be obtained as well as the effect mentioned in the aforesaid first embodiment.

Since the vibrating means 23A and the detecting means 23B are disposed spanning over the two support points A and B, the vibrating means 23A and the detecting means 23B are only required to be formed in a size corresponding to distance between the two support points A and B to be attached to the stylus holder 11, so that the processing and the assembly can be facilitated and the detection accuracy of the touch signal probe 20 of which size is reduced is not impaired.

Next, third embodiment of the present invention will be described below.

The stylus holder 11 of the touch signal probe 10 according to the aforesaid first embodiment is formed by a plate-shaped member and the vibrator attachment portion 112 is branched in two-ways so that the vibrator 12 is supported at the distal two points of the two-way branch.

Figure 5:
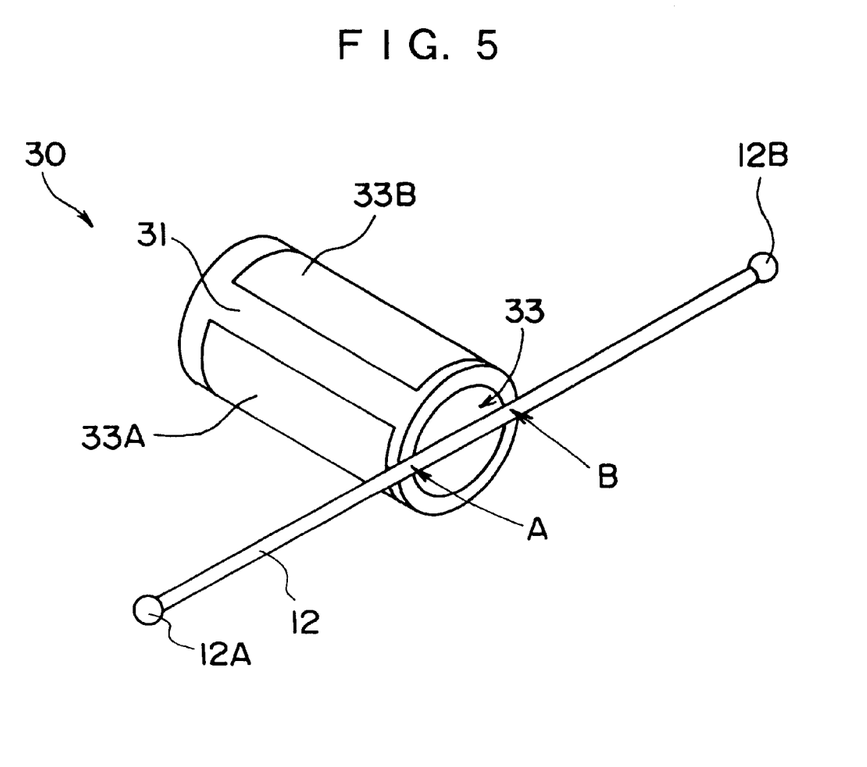
FIG. 5 is a summarized perspective view showing a touch signal probe according to third embodiment of the present invention.

In contrast thereto, a stylus holder 31 of a touch signal probe 30 according to the third embodiment is constituted of a cylindrical member and the vibrator 12 is supported by two support points A and B at an end of the cylindrical member, as shown in FIG. 5. The vibrator 12 has an axis orthogonal with a central axis of the cylinder of the stylus holder 31, in which the central axis crosses centroid position of the vibrator 12.

A pair of vibrating means 33A and a pair of detecting means 33B are formed on an outer circumference of the stylus holder 31 and common electrode 33 made of piezoelectric element is formed on an inner circumference of the stylus holder 31.

Figure 6:
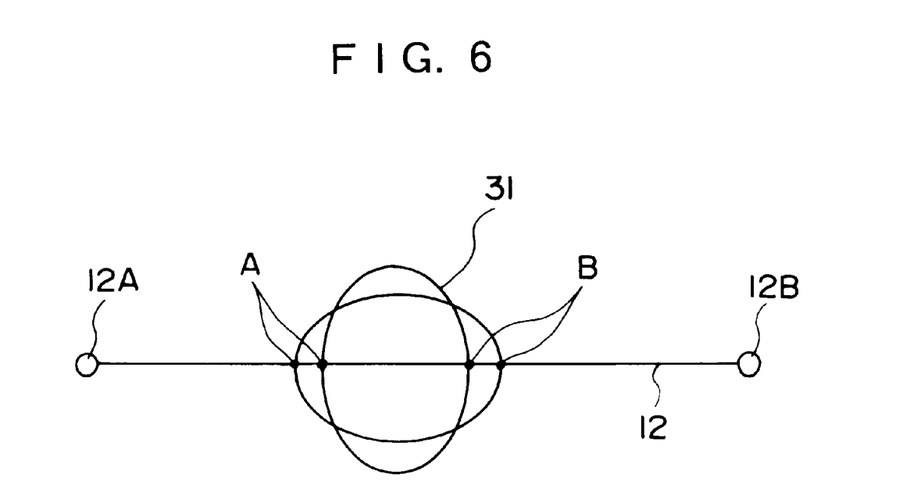
FIG. 6 is a schematic view for explaining structure for vibrating the vibrator of the aforesaid embodiment.

When electric voltage is applied to the vibrating means 33A of the touch signal probe 30, the end surface of the stylus holder 31 is deformed from a circle into an oval, as shown in FIG. 6 in a vibration mode in which a major axis or a minor axis of the oval is consistent with the axis of the vibrator 12.

Figure 7:
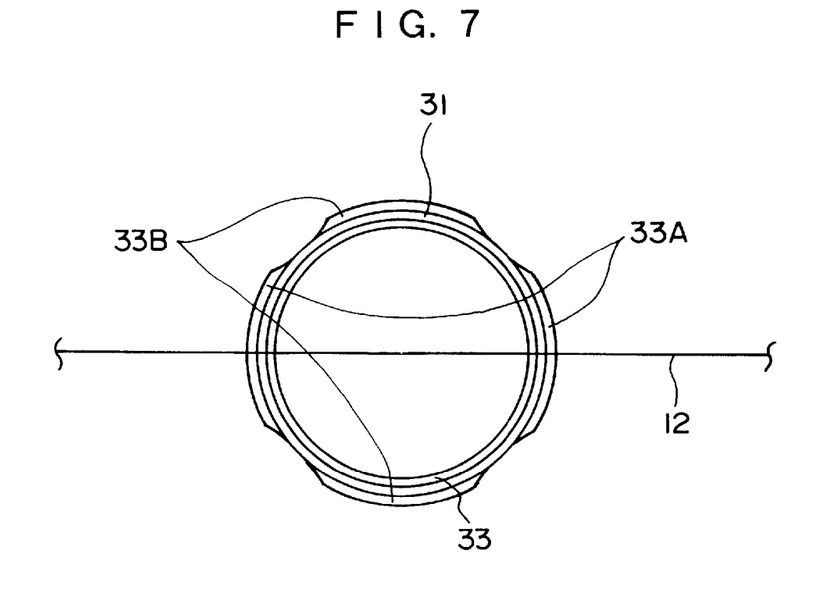
FIG. 7 is a cross section showing a structure of the stylus holder of the aforesaid embodiment.

In other words, as shown in FIG. 7, a quartered electrode is formed at the outer circumference of the stylus holder 31 so that respective centers of a pair of mutually opposing electrode in circumferential direction are consistent with the axis of the vibrator 12 and respective centers of the other pair of mutually opposing electrode in circumferential direction are consistent with an axis orthogonal with the axis of the vibrator 12. The electrodes oppositely disposed in the axial direction of the vibrator 12 constitute the vibrating means 33A and the electrodes oppositely disposed in an axial direction orthogonal with the axis of the vibrator 12 constitute the detecting means 33B. Incidentally, the vibrating means and the detecting means may be mutually exchanged and the vibrating means 33A may be constituted of one of the pair of electrodes disposed in the direction consistent with the axis of the vibrator 12. Further, as shown in FIG. 7, an entirety of inner cylindrical circumference of the stylus holder 31 has an electrode composed of a piezoelectric element, which is arranged as a common electrode 33.

According to the above-described third embodiment, following effect can be obtained as well as the effects mentioned in the aforesaid first embodiment.

Since the stylus holder 31 is made of a cylindrical member, the support points A and B for supporting the vibrator 12 can be formed utilizing a symmetrical construction of the cylindrical end. Accordingly, the mechanical impedance at the support points A and B of the stylus holder 31 can be easily made equal, thereby avoiding the structure of the stylus bolder 31 from being too complicated.

Fourth embodiment of the present invention will be described below.

In the touch signal probe 10 according to the first embodiment, the vibrating means 13A and the detecting means 13B are attached as independent bodies to span over the support points A and B of the stylus holder 11.

Figure 8:
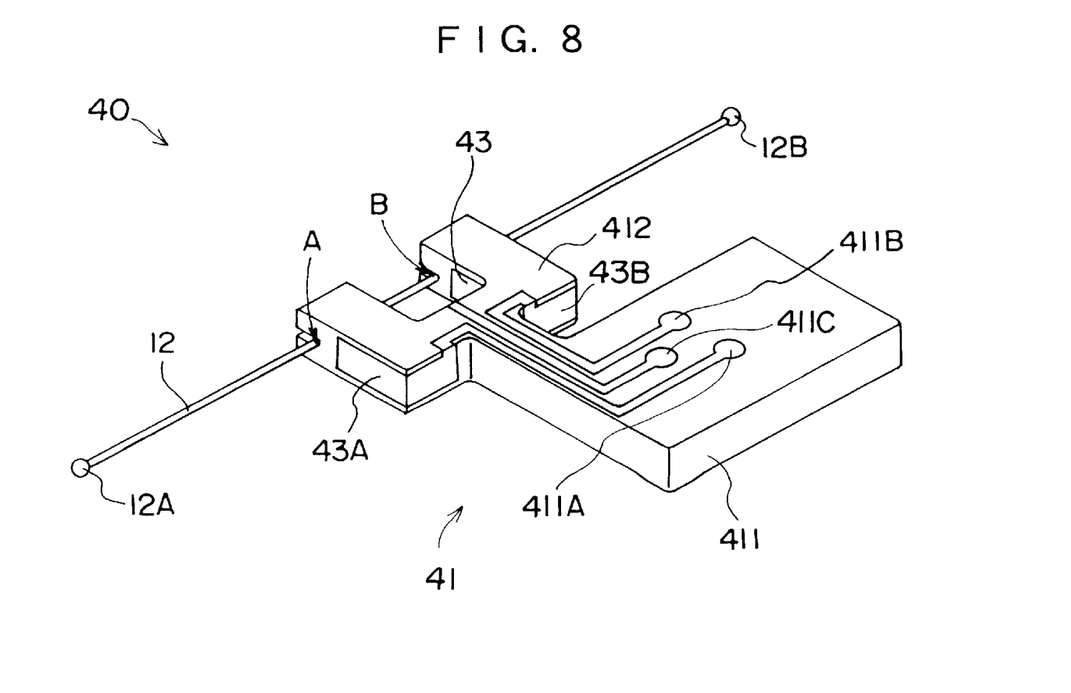
FIG. 8 is a summarized perspective view showing a touch signal probe according to fourth embodiment of the present invention.

In contrast thereto, though the touch signal probe 40 according to the fourth embodiment has a stylus holder 41 having similar outside appearance as the stylus holder 11 of the aforesaid first embodiment, a vibrating means 43A and a detecting means 43B are formed integrally with the stylus holder 41 so that the vibrating means 43A and the detecting means 43B are structural components of the stylus holder 41.

The stylus holder 41 is made of a piezoelectric element such as crystal, which is constituted of a stationary portion 411 and two-way branched vibrator attachment portion 412. The vibrating means 43A is formed on one of an outer side of the two-way branch of the vibrator attachment portion 412 and the detecting means 43B is formed on the other outer side. An inner side of the two-way branch of the vibrator attachment portion 412 has a common electrode 43. The vibrating means 43A, the detecting means 43B and the common electrode 43 are electrically connected to voltage applying terminal 411A, 411B and 411C formed on the stationary portion 411, so that the vibration described in FIG. 1 can be raised by applying a voltage of a predetermined frequency between the voltage applying terminal 411A and the common electrode 43. Incidentally, the configuration and arrangement of the aforesaid stylus holder 41, the vibrating means 43A etc. are defined in accordance with characteristic of piezoelectric material etc.

According to the touch signal probe 40 of the fourth embodiment, following effect can be obtained.

Since the vibrating means 43A and the detecting means 43B are formed integrally with the stylus holder 41 and the vibrating means 43A and the detecting means 43B are made to be a part of the stylus holder, the structure of the touch signal probe 40 can be simplified, thereby further facilitating the size reduction of the touch signal probe. Further, by integrally forming the vibrating means 43A etc. onto the stylus holder 41, a process for attaching the piezoelectric elements such as vibrating means and the detecting means to the stylus holder can be omitted, thereby simplifying the manufacturing process of the touch signal probe.

Incidentally, the scope of the present invention is not limited to the aforesaid respective embodiments but includes following modifications.

Figure 9:
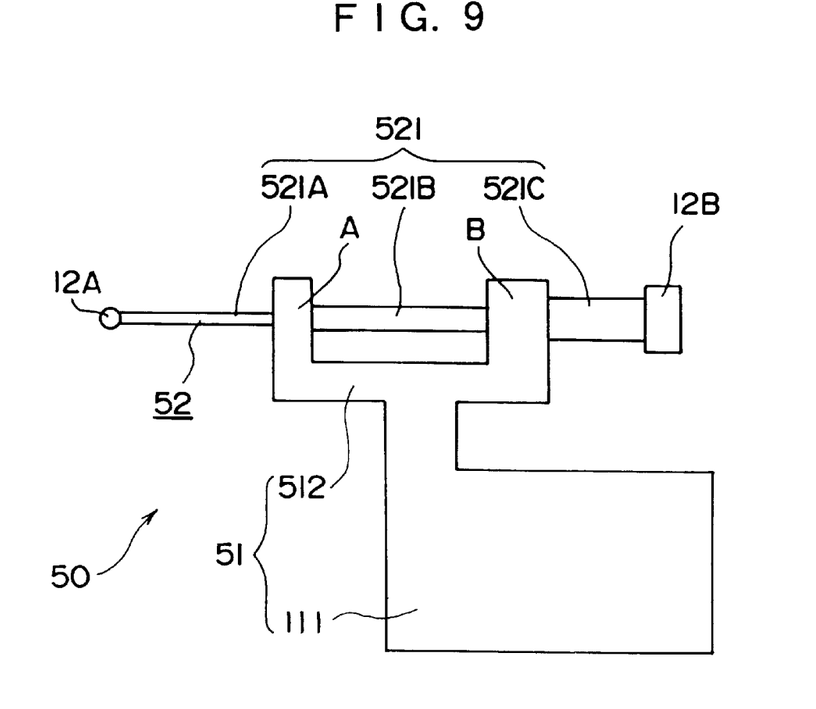
FIG. 9 is a front elevation showing a touch signal probe as a modification of the aforesaid respective embodiments.

Though the shaft constituting the vibrator 12 is made of a stick member of the same diameter in the aforesaid respective embodiments, other arrangement is possible. Specifically, as shown in FIG. 9, the present invention may be applied to a touch signal probe 50 having a vibrator 52, in which outer diameter shaft 521 of the vibrator 52 is changed step-wise in a distal portion 521A, an intermediate portion 521B and a base portion 521C. Alternatively, the present invention may be applied to a touch signal probe having a vibrator with a shaft of which outer diameter is gradually decreased in a tapered manner.

Figure 10:
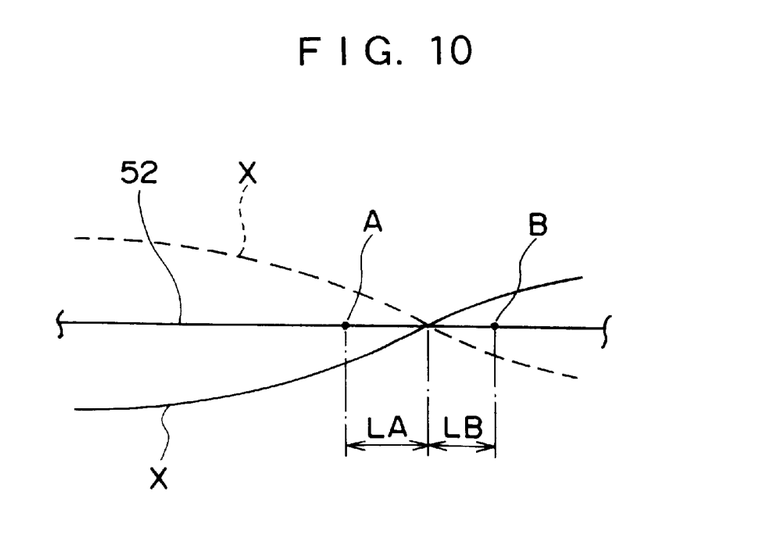
FIG. 10 is a schematic view for explaining a position of the node of vibration in the modification of the aforesaid embodiments.

In FIG. 9, the touch signal probe 50 is composed of a stylus holder 51 and the vibrator 52, in which the vibrator 52 is supported by support points A and B of a vibrator attachment portion 512 constituting the stylus holder 51. The shaft 521 of the vibrator 52 has the base portion 521C on which the counter balance 12B is provided, the intermediate portion 521B positioned between the support points A and B, and the distal portion 521A having the contact portion 12A. Since the diameter of the diametral cross section of the shaft 52 is decreased toward distal end thereof, centroid position of the vibrator 52 is retreated from the central position of the support points A and B to the base end. Accordingly, as shown in FIG. 10, though the node of vibration is not set at the central position of the support points A and B (LA>LB), the same effect mentioned in the aforesaid embodiment can be obtained when the node of vibration exists between the support points A and B. Incidentally, when the shaft 521 of the vibrator 52 changes step-wise, the node of vibration is preferably set to be consistent with the central position of the vibrator attachment portion 512 of the stylus holder 51. Specifically, the position of the node of vibration is determined through experiments, analysis and the like and is positioned to be consistent with the central position of the vibrator attachment portion 512.

Though the touch signal probe 10 to 50 according to the aforesaid respective embodiments are attached to coordinate measuring machine, but the present invention may be used for a contact-type probe for detecting a relative position of the workpiece and measuring machine such as height gauge and profile measuring machine.

Other specific arrangement and configuration may be used in implementing the present invention as long as the object of the present invention can be attained.

What is claimed is:

1. A touch signal probe, comprising:
   a stylus holder;
   a vibrator having a contact portion at a distal end thereof to contact a workpiece;
   a vibration generator for vibrating the vibrator in resonant condition in an axial direction of the vibrator; and
   a vibration detector for detecting a contact of the vibrator by a change in the vibration of the vibrator caused when the vibrator contacts the workpiece;
   wherein the vibrator is supported by the stylus holder at two distinct support portions, spaced apart in the axial direction of the vibrator with a node of vibration therebetween.

2. The touch signal probe according to claim 1, wherein the node of vibration of the vibrator is positioned spaced equally from the two support portions and is consistent with a centroid of the vibrator.

3. The touch signal probe according to claim 1, wherein the vibration generator and the vibration detector are disposed spanning over the two support portions.

4. The touch signal probe according to claim 1, wherein the stylus holder is made of a piezoelectric material; and the vibration generator and the vibration detector are integrated with the stylus holder.

5. The touch signal probe according to claim 1, wherein the vibration generator and the vibration detector are formed separately from the vibrator.

6. A touch signal probe, comprising:

a stylus holder;

a vibrator having a contact portion at a distal end thereof to contact a workpiece;

a vibration generator for vibrating the vibrator in resonant condition in an axial direction of the vibrator; and a vibration detector for detecting a contact of the vibrator by a change in the vibration of the vibrator caused when the vibrator contacts the workpiece; wherein the vibrator is supported by the stylus holder at two distinct support portions, spaced apart in the axial direction of the vibrator with a node of vibration therebetween;

the node of vibration of the vibrator is positioned spaced equally from the two support portions and is consistent with a centroid of the vibrator; and the vibration generator and the vibration detector are disposed spanning over the two support portions.

7. The touch signal probe according to claim 6, wherein the stylus holder is made of a piezoelectric material; and the vibration generator and the vibration detector are integrated with the stylus holder.

8. A touch signal probe, comprising:

a stylus holder;

a vibrator configured as a single rod and supported by the stylus holder at two distinct support portions spaced apart in an axial direction of the rod wherein the centroid of the rod is positioned between the two support portions;

a vibration generator for vibrating the rod resonantly in said axial direction; and a vibration detector for detecting a change in the vibration of the rod when one end of the rod contacts a workpiece.

9. The touch signal probe according to claim 8, wherein the centroid of the rod is positioned between and spaced substantially equally from the two support portions.

10. The touch signal probe according to claim 8, wherein the centroid of the rod is positioned between and spaced unequally from the two support portions.

11. The touch signal probe according to claim 8, wherein the rod is fixed to the stylus holder at the support portions by an adhesive.

12. A touch signal probe, comprising:

a stylus holder;

a vibrator configured as a single rod and supported by the stylus holder at two distinct support portions spaced apart in an axial direction of the rod;

a vibration generator for vibrating the rod resonantly in said axial direction; and a vibration detector for detecting a change in the vibration of the rod when one end of the rod contacts a workpiece;

wherein the stylus holder has a tube configuration, and the rod is supported at an end face of the stylus holder.

13. The touch signal probe according to claim 12, wherein the stylus holder is formed as a cylinder, and the rod extends diametrically across said end face of the stylus holder.

14. The touch signal probe according to claim 12, wherein the stylus holder is made of a piezoelectric material, and each of the vibration generator and the vibration detector comprises at least a pair of electrodes formed on outer and inner surfaces of the stylus holder, respectively.

15. A touch signal probe, comprising:

an U-shaped stylus holder having first and second branch portions extending from a base portion;

a vibrator configured as a single rod and supported by distal ends of the first and second branch portions;

a vibration generator for vibrating the rod resonantly in an axial direction of the rod; and a vibration detector for detecting a change in the vibration of the rod when one end of the rod contacts a workpiece;

wherein the vibration generator and the vibration detector are formed as upper and lower piezoelectric elements which extend along the rod, between the distal ends of the first and second branch portions, and above and below the stylus holder, respectively.

16. The touch signal probe according to claim 15, wherein the upper piezoelectric element functions as one of the vibration generator and the vibration detector while the lower piezoelectric element functions as the other of the vibration generator and the vibration detector.

17. The touch signal probe according to claim 15, wherein one of the vibration generator and the vibration detector comprises portions of the upper and lower piezoelectric elements which span over the distal end of the first branch portions, while the other of the vibration generator and the vibration detector comprises portions of the upper and lower piezoelectric elements which span over the distal end of the second branch portions.

18. A touch signal probe, comprising:

an U-shaped stylus holder having first and second branch portions extending from a base portion;

a vibrator configured as a single rod and supported by distal ends of the first and second branch portions;

a vibration generator for vibrating the rod resonantly in an axial direction of the rod; and a vibration detector for detecting a change in the vibration of the rod when one end of the rod contacts a workpiece;

wherein the stylus holder is made of a piezoelectric material, and each of the vibration generator and the vibration detector comprises a pair of electrodes formed on outer and inner surfaces of one of the first and second branch portions of the U-shaped stylus holder, respectively.

19. The touch signal probe according to claim 18, wherein the electrodes formed on the inner surfaces of the first and second branch portions are commonly connected.

* * * * *